PLOWS.
[114] Plows.
REGISTRATION
9731.+
DEVELOPMENT.
9731 X
Hinteren
JOSHUA GIBB'S
PLOUGH.
Patented 16 June 1836.
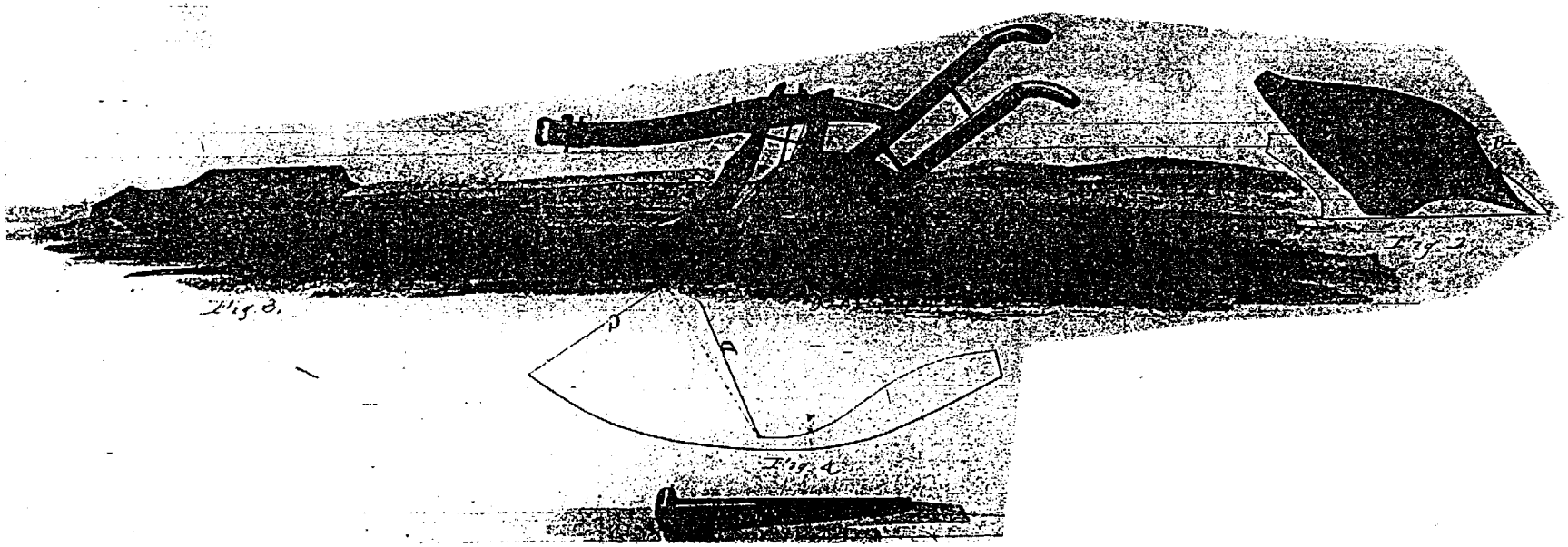

9731X

June 16. 1836

413

Joshua Gibbs.

The Schedule referred to in these Letters Patent, and making
part of the same, containing a description in the words of the said
Joshua Gibbs himself of his Improvement in the construction
of the Plough.

To all to whom these presents shall come.
Be it known that I Joshua Gibbs of Canton, in the County of
Stark and State of Ohio. have invented a new and useful im-
provement in the construction of the Plough, and that the fol
lowing is a full and exact description thereof, of that part
which I claim as my own invention, and which was not
previously known.

1st. In the mould board, which has on the front part at
letter P. in drawing No 1&2. a slip mortise to receive a tenon
on the land side as hereafter described.
2d. In the land side which has on the front end at letters
A. in drawing No 1&3. an offset towards the mould board or
a tenon, which laps into and closely fills the slip mortise
in the mould board, leaving the outer surface smooth. The
benefits of these are, that the two pieces are fastened firmly
together, and firmness and solidity are thereby given to the Plough.
3d. In the bottom of the mould board, as represented in drawing No
4. letters B. & L. which drawing represents the bottom of the
mould board. The dotted line in said drawing running at right
angles from the land side (represented by letter B) is the rear of the
bottom of the mould board, according to the present mode of con-
structing them. The black line in the rear of this dotted line (at
letter L) is the rear termination in my improvement. It projects
three fourths of an inch back of the dotted line, and rests against

6/16/1836 9731X

414.

the main post. This formation of the mould board also gives greater strength to the Plough.

4th In the long screw, running up through the share, the mould board and the beam commonly called the false coulter. instead of being straight according to the old mode. it is one third larger in diam-eter at the lower end, when it passes through the share, than at the upper part, after it has passed up through the mould board. The head of the false coulter describes but half a circle, leaving one side of it smooth, in order that it may pass through the share, close to the bar of the share. This plan leaves the false coulter strong at the lower part, where the strain comes, and smaller at the upper part where it passes through the beam, so as not to weaken the beam.

Witness
Hiram Griswold }
Geo. Dunbar. }

Joshua Gibbs.

Exd
H.G.

(468 words

Patented June 16th 1836

Drawing